US011150366B2

(12) United States Patent
Barry et al.

(10) Patent No.: US 11,150,366 B2
(45) Date of Patent: Oct. 19, 2021

(54) LATCH MECHANISM FOR STREAMER DEVICE

(71) Applicant: ION Geophysical Corporation, Houston, TX (US)

(72) Inventors: Ronald Karl Barry, Harahan, LA (US); Christian Joseph Christensen, Harahan, LA (US)

(73) Assignee: Ion Geophysical Corporation, Houston, TX (US)

( * ) Notice: Subject to any disclaimer, the term of this patent is extended or adjusted under 35 U.S.C. 154(b) by 0 days.

(21) Appl. No.: 16/507,732

(22) Filed: Jul. 10, 2019

(65) Prior Publication Data

US 2020/0018866 A1 Jan. 16, 2020

Related U.S. Application Data

(60) Provisional application No. 62/696,167, filed on Jul. 10, 2018.

(51) Int. Cl.
| *F16M 11/00* | (2006.01) |
| *G01V 1/20* | (2006.01) |
| *F16G 11/00* | (2006.01) |
| *F16M 13/02* | (2006.01) |
| *G01V 1/38* | (2006.01) |

(52) U.S. Cl.
CPC .............. *G01V 1/202* (2013.01); *F16G 11/00* (2013.01); *F16M 13/02* (2013.01); *G01V 1/3843* (2013.01)

(58) Field of Classification Search
CPC . G01V 1/201; G01V 1/16; G01V 1/20; B63B 21/66
See application file for complete search history.

(56) References Cited

U.S. PATENT DOCUMENTS

| 4,879,719 A * | 11/1989 | Dumestre, III | ......... F16B 21/02 367/20 |
| 5,214,612 A | 5/1993 | Olivier et al. | |
| 5,937,782 A * | 8/1999 | Rau | ...................... G01V 1/3826 114/247 |

(Continued)

FOREIGN PATENT DOCUMENTS

| EP | 0581441 A2 | 2/1994 |
| FR | 2803900 A1 | 7/2001 |
| WO | 2017087527 A1 | 5/2017 |

OTHER PUBLICATIONS

Invitation to Pay Additional Fees and, Where Applicable, Protest Fee dated Oct. 8, 2019 in connection with PCT/US2019/041206, 14 pages.

(Continued)

*Primary Examiner* — Amy J. Sterling
(74) *Attorney, Agent, or Firm* — Patterson + Sheridan, LLP

(57) ABSTRACT

A streamer device or other system can include a pylon configured to attach to a locking collar, and a latch mechanism with a seat component. The latch mechanism comprises a pin member configured to attach to the locking collar, and a bias component. The seat component can be configured to retain the bias component when the pylon is attached to the locking collar, and the bias component can be configured to bias the pin member to hold the locking collar to the pylon. The bias may responsive to a position of the seat component, or determined or controlled at least in part based on the position.

24 Claims, 12 Drawing Sheets

(56) References Cited

U.S. PATENT DOCUMENTS 7,793,606 B2    9/2010   Olivier et al.
8,223,585 B2    7/2012   Seale et al.
8,520,468 B2    8/2013   Seale et al.

OTHER PUBLICATIONS

International Search Report and Written Opinion dated Dec. 2, 2019 in connection with PCT/US2019/041206, 23 pages.
International Preliminary Report on Patentability for Application No. PCT/US2019/041206 dated Jan. 12, 2021.

* cited by examiner

LATCH MECHANISM FOR STREAMER DEVICE

CROSS-REFERENCE TO RELATED APPLICATIONS

This Application claims priority to U.S. Provisional Application No. 62/696,167, filed Jul. 10, 2018, which is incorporated by reference herein, in the entirety and for all purposes.

BACKGROUND

This disclosure relates to seismic exploration, including streamer systems for marine seismic surveys. In seismic survey systems, external or auxiliary streamer devices may be coupled to a streamer cable at various positions along its length using collars that surround the streamer cable. The collar may be attached to a pylon of a streamer device via via an attachment assembly. As the streamer device is towed through a water column via the cable, various forces are applied between the attachment assembly and the streamer device housing. In some examples, the force applied between the respective attachment assembly and the streamer device housing may exceed structural limits one one or more components, which may lead to a failure that results in separation of the streamer device from the cable. In some examples, the failure may include damage to a structure of the streamer device, such as a seat that holds the attachment assembly. One repair method includes inserting a threaded screw into the damaged housing such that the threads of the threaded screw to absorb the pulling forces applied between the attachment assembly and the streamer device housing during operation. However, the threaded screw repair method lacks the structural integrity necessary to withstand the continuous pulling forces between the attachment assembly and the streamer device housing during operation, which often leads to failure and potential loss of the streamer device.

SUMMARY

Streamer devices and other systems can be configured to attach to a locking collar. A pylon on the device can be configured to retain a latch mechanism with a seat component. The latch mechanism can use a dovetail pin or similar member to attach to the locking collar, and a spring or similar compression bias component. The seat component can be configured to provide a seat to retain the compression bias component, for example at a first end. When the pylon is attached to the locking collar, the compression bias component can apply a spring bias force on the pin member to hold attach the locking collar to the streamer device. The bias force can be controlled, at least in part, based on the position of the seat. The bias force can be controlled or determined responsive to positioning of the seat component; e.g., with an eccentric pin member. In some embodiments, the streamer devices have two pylons, each with a latching mechanism, and a number of such devices a can be attached to corresponding locking collars disposed along a streamer.

DETAILED DESCRIPTION

Figure 1:
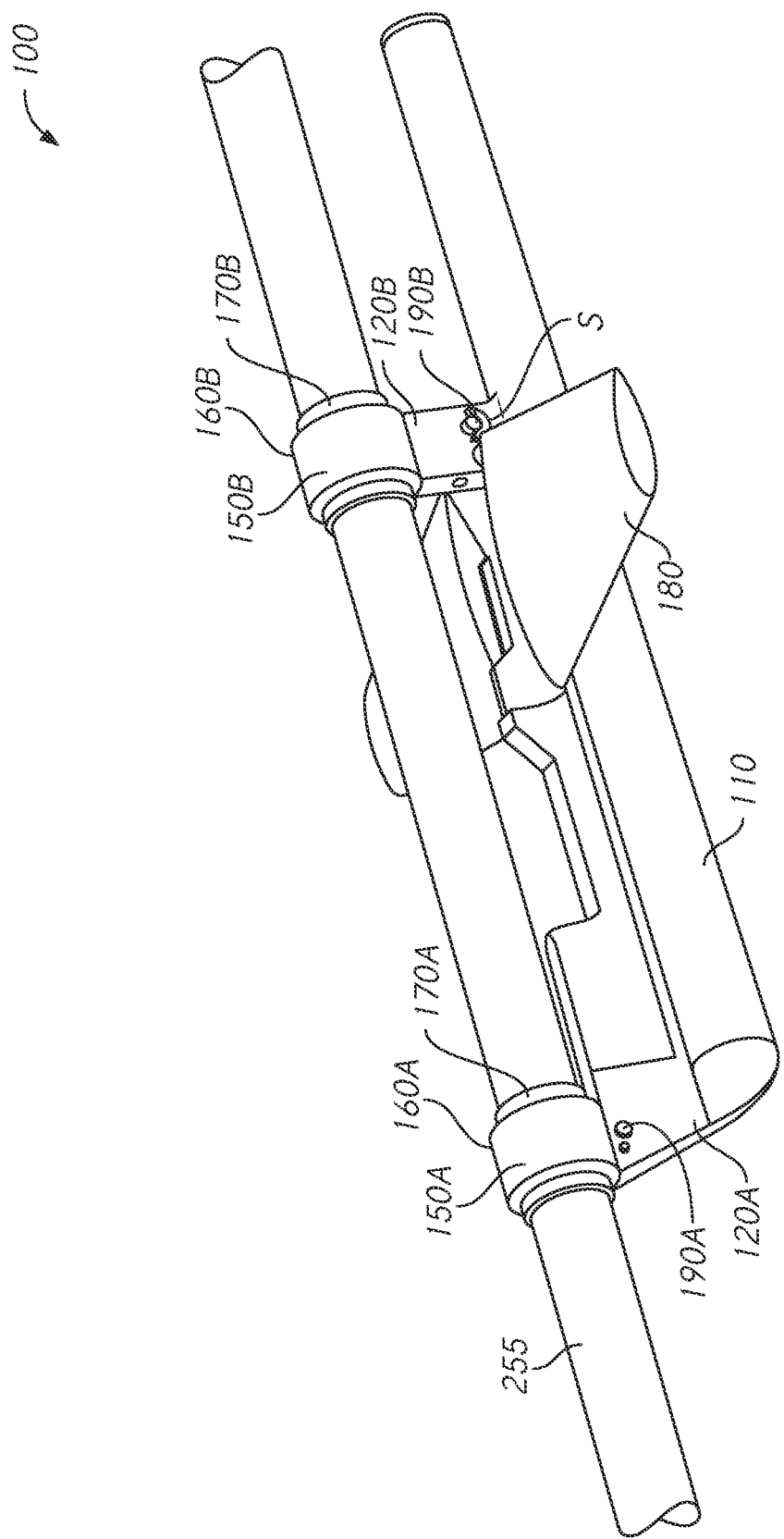
FIG. 1 is an illustration of a portion of a seismic streamer system 100 in accordance with embodiments of the disclosure.

This disclosure includes embodiments of latch mechanism seat design and/or repair solutions for streamer devices that may reduce cost and provide equivalent or superior performance as compared with existing designs. In some examples, the described latch mechanism seat design embodiments may be implemented during production to provide a stronger seat design, while also allowing for easy repair when damaged. In some examples, the described latch mechanism seat design embodiments may be implemented as a repair or modification solution to modify a conventional latch mechanism seat design (e.g., whether damaged or not) with a more robust and reliable latch mechanism seat design.

Streamer devices may include positional control devices (e.g., for depth, lateral control, vector control, or any combination thereof), velocimeters (e.g., configured to measure speed of sound in water), speedlog devices (e.g., configured to measure water speed), or acoustic ranging devices. The streamer devices may include various elements to perform the designed function, such as transceivers configured to communicate with a vessel, remote-operated vehicle, or other component associated with the seismic system; sensors to perform the designed function, and/or fixed or motor-controlled vanes, or wings, to stabilize or position the streamer cable within a water column.

The streamer devices may be coupled (e.g., attached, affixed, connected, etc.) to a streamer cable at selected positions along the length of the streamer cable using collars. Each collar may include cylindrical inner and outer races surrounding the streamer cable. The inner race may be affixed to the streamer cable, and the outer race, to which the streamer device is coupled, can freely rotate about the inner race and, hence, the streamer cable. The outer race (e.g., or locking collar) may include a locking slot designed to slidably receive a dovetail pin or similar pin member extending from a chamber in a pylon (e.g., structural member configured to carry a load) of the corresponding streamer device.

For example, the pylon may be attached to the locking collar by inserting the top of the extended dovetail pin through the circular opening in the locking slot and sliding a neck of the dovetail pin along a slot and away from the circular opening. As the pin slides to the end of the locking slot opposite the circular opening, a locking rod, under spring pressure in a chamber in the pylon, pops into the circular opening of the locking slot, thereby preventing the dovetail pin from sliding back and releasing the engagement.

The dovetail pin may hold tension on the locking collar via spring force applied by a compression spring or similar bias component. The compression bias component may be held in place at an upper end via a seat or shoulder that is either built into or affixed in some way to the pylon. This spring force is configured to hold the respective locking collar to the streamer device, while also absorbing sudden changes in force (e.g., tensile, lateral, or longitudinal forces, or combinations thereof) as the streamer cable attempts to pull the respective locking collar in a different direction than the streamer device while moving through a water column.

However, in some examples, the force applied between the respective locking collar assembly and the latch mechanism may exceed structural limits of the pylon, seat, latch mechanism, the respective locking collar assembly, or combinations thereof. Exceeding structural limits may lead to a failure that results in the respective locking collar assembly completely or partially pulling away from the respective pylon of the streamer device. In some examples, this excessive force leading to failure may be due to external causes, such as part of the streamer device catching on part of a vessel or other equipment during deployment or recovery, catching on a fishing net or other debris in the water column, excessive currents, normal wear and tear, or other events.

Often, because the applied forces are generally concentrated in the seat that holds the upper end of the compression bias component and the bias component itself, the failure is related to damage to the seat and/or the bias component. If the seat that holds the compression mechanism is built into the pylon and is damaged, the streamer device may have to be replaced absent an available repair solution. Replacement of the streamer device increases operational costs for operators, and is undesirable. In addition, some repair solutions may include using materials that introduce susceptibility to corrosion, increase wear on other latch mechanism components, reduce accuracy or require re-calibration of the streamer device, and/or reduce pull-out performance as compared with the original seat design.

FIG. 1 is an illustration of a portion of a seismic streamer system 100 in accordance with embodiments of the disclosure. The system 100 may include a streamer device 110 attached to a section of a streamer cable 140 via front 150A and rear 150B collar assemblies. The streamer device 110 may include a positional control device, a velocimeter, a speedlog device, an acoustic ranging device, or any combination thereof. The streamer device 110 is shown in a working orientation, with the pylons 120A and 120B disposed generally vertically, and oriented upward with respect to the top of FIG. 1. While FIG. 1 depicts and describes the streamer device 110 as having the pylons 120A and 120B for attachment to a streamber cable 140, it is appreciated that the pylons 120A and 120B may include any structural member of the streamer device 110 configured to carry a load to facilitate attachment to the streamer cable 140.

The front 150A and rear 150B collar assemblies may each include a respective cylindrical inner race 170A and 170B surrounding and affixed to the streamer cable 140 and a respective cylindrical outer race 160A and 160B engaged with the respective inner race 170A and 170B such that the respective outer race 160A and 160B can rotate around the respective inner race 170A and 170B. The streamer device 110 may be fastened to the locking collar assemblies 150A and 150B via latch mechanisms housed in pylons 120A and 120B of the streamer device 110.

Thus, the streamer device 110 attached to the streamer cable 140 may be free to rotate about fixed positions on the cable by means of the respective inner races 160A and 160B and the respective outer races 170A and 170B. During deployment, the streamer device 110 may include stabilization or steering foils 180 that are configured to stabilize or control a position of the streamer device 110 as it moves through a water column. When set to maintain a certain position, the steering foils 180 may remain relatively stable with the streamer cable 140 free to rotate within the locking collars or collar assemblies 150A and 150B.

Each of the pylons 120A and 120B may include a latch mechanism that is configured to attach the streamer device 110 to the streamer cable 140. In some examples, the latch mechanisms may include a dovetail pin that is configured to engage the respective locking collar 150A and 150B. In some examples, the latch mechanism may also include a locking rod also configured to engage the respective locking collar 150A and 150B.

The dovetail pin may be inserted through a bias component (e.g., a compression spring, Belleville spring or washer assembly, etc.). The bias component may be installed between a stopping device attached to the dovetail pin at a first (e.g., lower) end of the bias component and a seat (e.g., shoulder) contained in the pylon 120A and 120B that is separate from the dovetail pin at a second (e.g., upper) end of the bias component. The compression mechanism may be engaged (e.g., relaxed after attachment/installation to hold the respective locking collar 150A and 150B using a spring force) and disengaged (e.g., compressed to facilitate attachment/installation of the respective locking collar 150A and 150B) by slidably engaging a central eccentric camming surface to raise and lower the lower stopping device. The camming surface may be controlled using one or more eccentric pins 190A, 190B extending transversely (or transversally) through the respective pylon 120A, 120B.

Thus, when installed, the dovetail pin is retracted to lower the eccentric camming surface, which partially relaxes the compression bias component such that a spring force is applied between the seat and the lower stopping device. This spring force is configured to hold the respective locking collar 150A and 150B to the streamer device 110, while also absorbing sudden changes in force (e.g., tensile, lateral, longitudinal forces, or combinations thereof) as the streamer cable 140 attempts to pull the respective locking collar 150A and 150B in a different direction than the streamer device 110 while moving through a water column.

However, in some examples, the force applied between the respective locking collar 150A and 150B and the latch mechanism may exceed structural limits of the pylon 120A and 120B, seat, latch mechanism, the respective locking collar 150A and 150B, or combinations thereof. Exceeding structural limits may lead to a failure that results in the respective locking collar 150A and 150B completely or partially pulling away from the respective pylon 120A and 120B of the streamer device 110. In some examples, this excessive force leading to failure may be due to external causes, such as part of the streamer device 110 catching on part of a vessel or other equipment during deployment or recovery, catching on a fishing net or other debris in the water column, excessive currents, normal wear and tear, or other events. Often, because the applied forces are generally concentrated in the seat that holds the upper end of the compression bias component and the bias component itself, the failure is related to damage to the seat and/or bias component.

In some examples, the streamer device 110, including the pylons 120A and 120B, may be constructed (e.g., milled, printed, fabricated, molded, etc.) from a single type of material, such as a polyurethane material. As part of the construction, seat may be milled/molded/fabricated/etc. directly into the pylons 120A and 120B. Therefore, when the seat is damaged, the entire the streamer device 110 may need to be replaced if the seat is damaged beyond repair, which may be costly to an operator absent a repair solution.

However, in some examples configuration of the seat design associated with the latch mechanism and/or or a repair of the seat in an existing design of the streamer device 110 may be implemented to mitigate a total loss of the streamer device 110. In some examples, the pylons 120A and 120B and/or the seat implementation may be designed such that the seat is formed from a separate seat-forming component, which is then installed on or in the respective pylon 120A and 120B to provide a structure to hold the second (e.g., upper end) end of the compression bias component.

The separate seat component may be an unthreaded component that is installed into the respective pylon 120A and 120B, and may be formed from at least one of aluminum, stainless steel, a thermoplastic material (e.g., a polycarbonate material such as an acetal material), thermoset, or a metal alloy (e.g., including at least one of titanium, brass, or bronze). The seat component may be primarily retained in the respective pylon 120A and 120B via tensile, compressive, or shear force, or any combination thereof. Reliance on primarily tensile, compressive, and/or shear forces to retain the seat component may provide superior yield strength as compared with a solution that relies primarily on hoop stress or force to retain the seat component. In some examples, at least a portion of the separate seat component may be constructed from a same material as the respective pylon 120A and 120B.

Figure 2A:
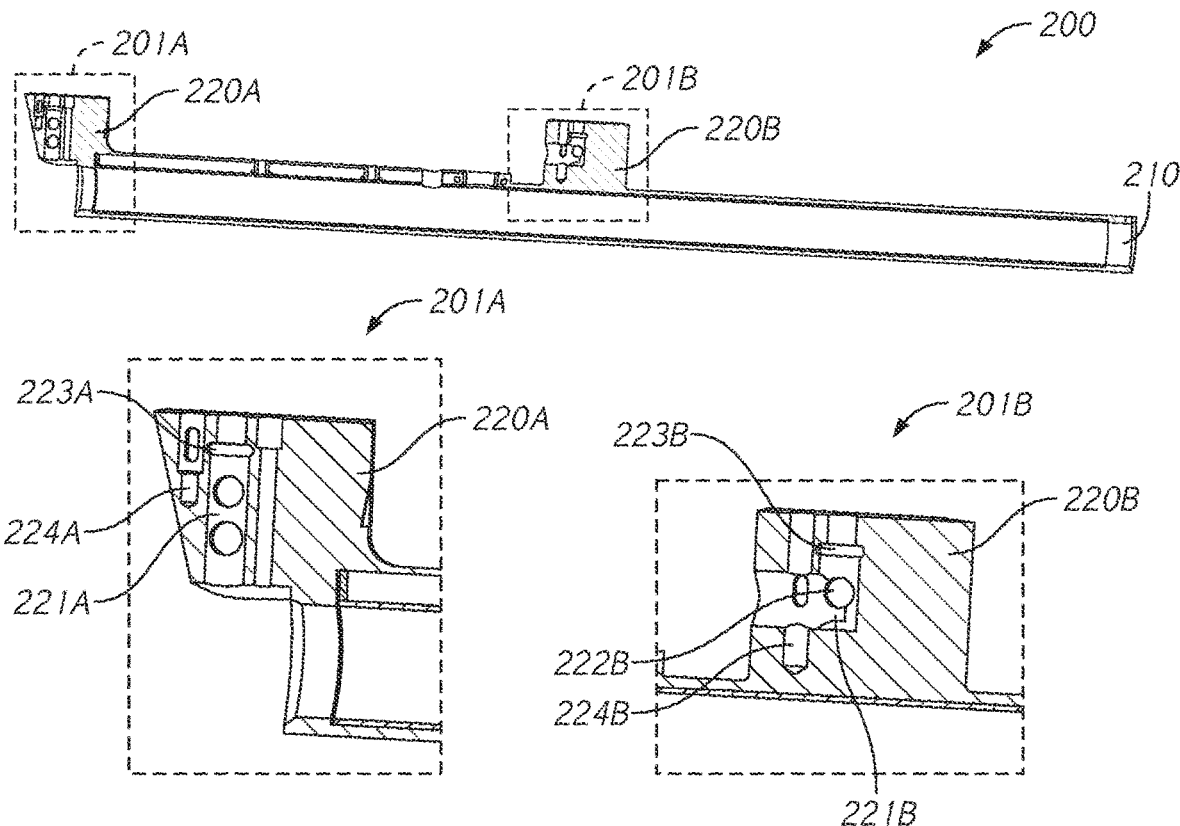
FIG. 2A depicts cross-sectional views of a streamer device in accordance with embodiments of the disclosure.
Figure 2B:
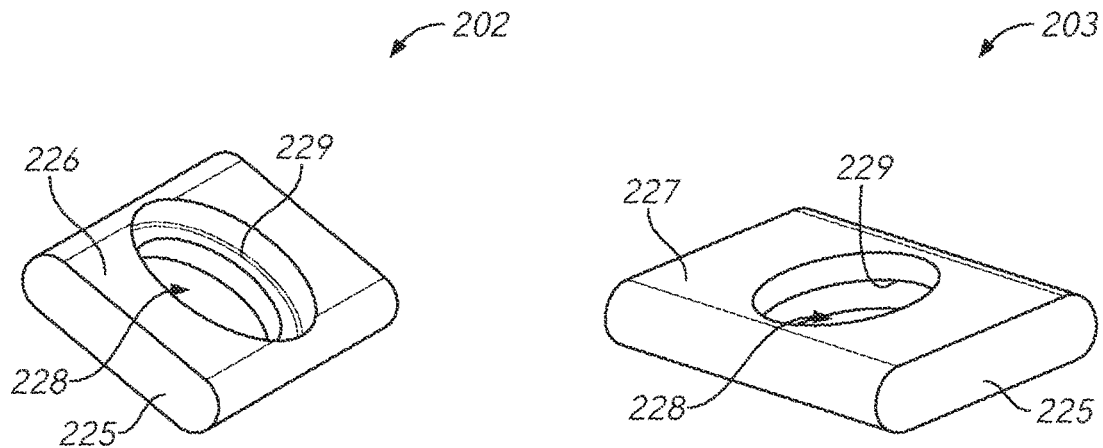
FIG. 2B depicts isometric views of a seat plate in accordance with embodiments of the disclosure.

In other examples, the seat component may be constructed from a different material, such as aluminum, a thermoplastic material, stainless steel, or any other material suitable for a seismic streamer application. In some examples, the material(s) may be selected based on a lack of magnetic (nonmagnetic) properties and/or reduced susceptibility (resistance) to corrosion in a saltwater environment. In some examples, the seat component may be selectively removable from the respective pylon 120A and 120B. Examples of the seat component may include a seat plate that is inserted or installed into a milled slot in the respective pylon 120A and 120B, a seat tube insert that is inserted or installed into a seat tube insert bore (e.g., a cylindrical bore) in the respective pylon 120A and 120B, or a modular latch mechanism section that is inserted or installed to into a modular latch chamber of the respective pylon 120A and 120B. These examples may provide equivalent or greater pull-out performance as a built-in seat implementation, and avoid replacement of an entire streamer device when a seat is damaged FIGS. 2A-2D depict examples of a first embodiment of a streamer device implementation that includes the seat plate (e.g., as the seat component) in accordance with embodiments of the disclosure. FIG. 2A depicts cross-sectional views 200, 201A, and 201B of a streamer device 210 in accordance with embodiments of the disclosure. FIG. 2B depicts isometric views 202 and 203 of a seat plate 225 in accordance with embodiments of the disclosure.

The streamer device 110 of FIG. 1 may implement the streamer device 210 and the seat plate 225, in some examples. The streamer device 210 includes pylons 220A and 220B. For clarity, some features of the streamer device 210 are excluded. However, it is understood that the streamer device 210 may include all of the features described with reference to the streamer device 110 of FIG. 1 without departing from the scope of the disclosure. While FIG. 2A depicts and describes the streamer device 210 as having the pylons 220A and 220B for attachment to a streamer cable, it is appreciated that the pylons 220A and 220B may include any structural member of the streamer device 210 configured to carry a load to facilitate attachment to the streamer cable.

The cross-sectional view 200 is a cross-sectional view of the entire streamer device 210. The cross-sectional view 201A is a magnified cross-sectional view of the pylon 220A and the cross-sectional view 201B is a magnified cross-sectional view of the pylon 220B.

As shown, the pylon 220A includes a dovetail pin aperture or chamber 221A configured for the dovetail pin retention mechanism including the compression bias component, an aperture 222A that extends transversely through the pylon 220A and is configured to receive an eccentric pin, a slot 223A extending transverse to the pylon 220A, substantially perpendicular to the longitudinal axis, and configured for the seat plate 225, and a vertical bore 224A configured for a locking rod mechanism. Similarly, the pylon 220B includes a dovetail pin chamber 221B configured for the dovetail pin retention mechanism including the bias component, an aperture 222B that extends transversely through the pylon 220A and is configured to receive an eccentric pin, a slot 223B similarly configured to for the seat plate 225, and a vertical bore 224B configured for a locking rod mechanism. The slots 223A and 223B may extend transversely through the respective pylon 220A and 220B, and have dimensions based on measurements of the seat plate 225. In some examples, a respective horizontal (e.g., longitudinal) length of the slots 223A and 223B is greater than a respective vertical height.

The isometric view 202 of FIG. 2B is a view of a bottom surface 226 (e.g., bottom surface when installed in the respective slot 223A or 223B) of the seat plate 225 and the isometric view 203 of FIG. 2B is a view of a top surface 227 (e.g., top surface when installed in the respective slot 223A or 223B) of the seat plate 225. The seat plate 225 may include a aperture 228 that extends through the seat plate 225 insert from a first surface (e.g., the bottom surface 226) to a second surface (e.g., the top surface 227).

The aperture 228 may have a circular or oval shape, in some examples. The diameter of the aperture 228 may be different at the bottom surface 226 than at the top surface 227. For example, the aperture 228 may have a first diameter that extends from the bottom surface 226 toward the top surface 227 to a transition point or feature (e.g., seat or shoulder) 229 and a second diameter that extends from the top surface 227 toward the top surface 227 to the transition 229.

The transition 229 may form the seat or shoulder that is configured to hold an upper end of a compression bias component of a latch mechanism in the pylon 220A and 220B. Thus, the first diameter may be greater than the second diameter. In some examples, the first diameter of the aperture 228 may be based on a diameter of the bias component and the second diameter may be based on the diameter of the dovetail pin. The seat 229 may be located approximately half-way through a thickness of the seat plate 225, in some examples. In other examples, the seat 229 may be located closer to the bottom surface 226 or closer to the top surface 227.

The measurements of the seat plate 225 may be based on a lateral thickness of the pylon 220A and 220B, as well as the material and desired characteristics of the seat plate 225. In applications the seat plate 225 may be designed with a more robust material and/or a greater thickness. The seat plate 225 may be constructed from at least one of aluminum, stainless steel, a thermoplastic material (e.g., a polycarbonate material such as an acetal material), thermoset, or a metal alloy (e.g., including at least one of titanium, brass, or bronze), any other material suitable for a seismic streamer application, or combinations thereof. In some examples, the material(s) may be selected based on a lack of magnetic (nonmagnetic) properties and/or reduced susceptibility (resistance) to corrosion in a saltwater environment.

In some examples, the seat plate 225 may further include a notch that is configured to hold or retain the seat plate 225 in the respective slot 223A and 223B. For example, the notch may be configured to mate with a protrusion in the respective slot 223A or 223B. In some examples, one or both of the slots 223A and 223B may be formed in the respective pylons 220A and 220B in response to damage to an original built-in seat in the pylons 220A and 220B. In some examples, one of the pylons 220A or 220B may include a built-in seat and the other may include the respective slot 223A or 223B, such as in a situation where only one built-in seat was damaged. In implementations where the slots 223A and 223B are formed to repair a damaged built-in seat, the vertical position of the slots 223A and 223B may be selected such that when a seat plate 225 is installed, the seat 229 of the seat plate 225 is in a same approximate vertical position as the original built-in seat. In other examples, the pylons 220A and 220B may be originally manufactured with the slots 223A and 223B configured to receive the seat plate 225. In either implementation, damage to the seat 229 of the seat plate 225 may be repaired by replacing the seat plate 225, rather than replacing an entire device 210, which may reduce operational costs.

Figure 2C:
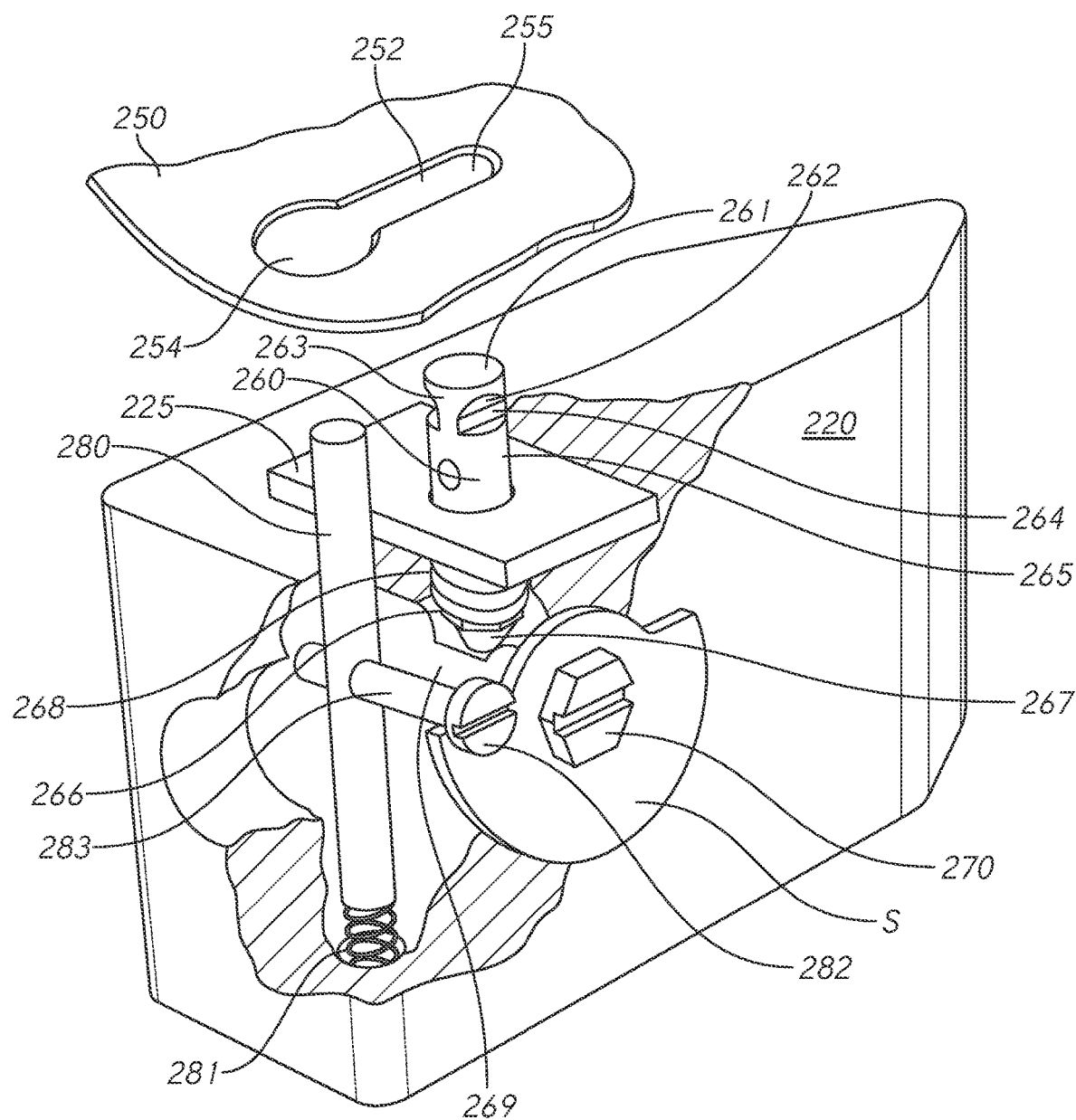
FIG. 2C is a cutaway of the pylon with a latch mechanism and a seat plate 225 installed in accordance with embodiments of the disclosure.
Figure 2D:
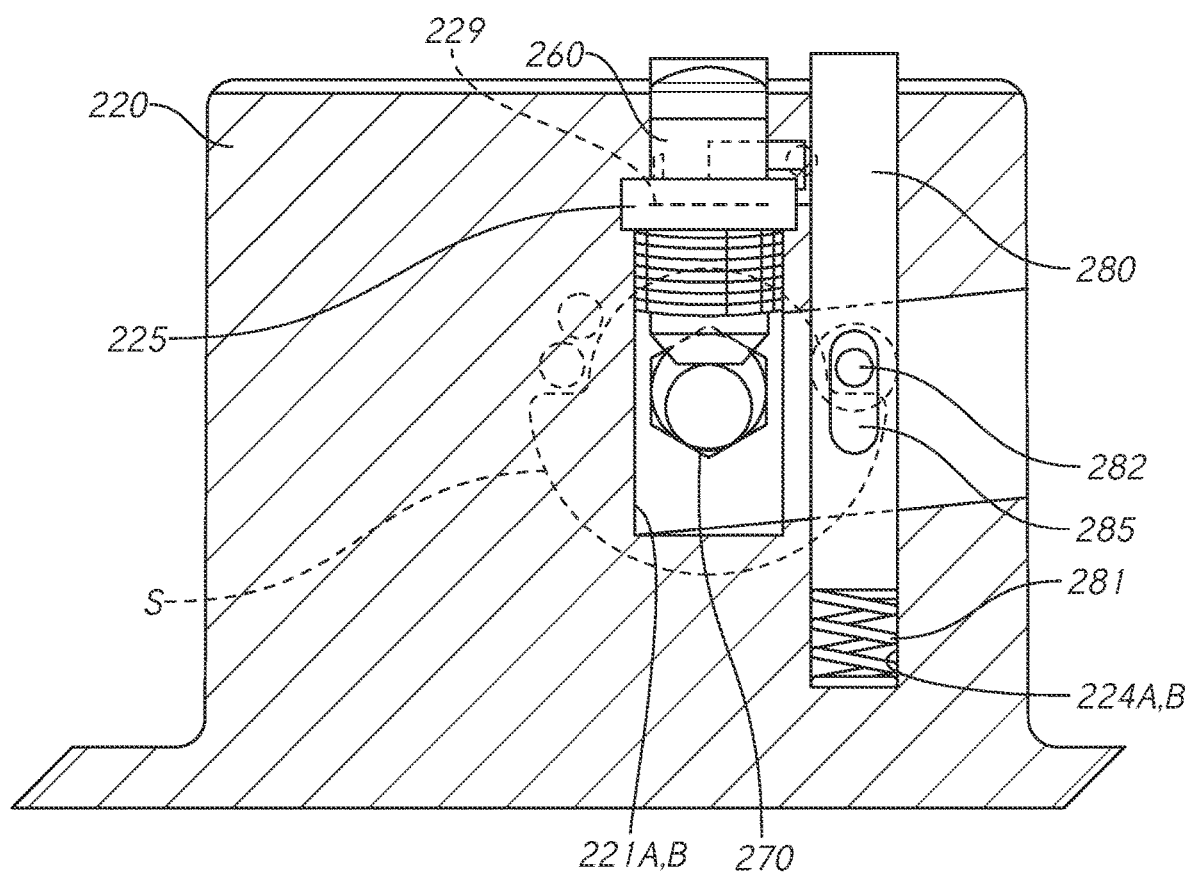
FIG. 2D is a cutaway side view the pylon with a latch mechanism and the seat plate installed in accordance with embodiments of the disclosure.

FIGS. 2C and 2D are cutaway views of a pylon 220 in accordance with embodiments of the disclosure. FIG. 2C is a cutaway view of the pylon 220 with a latch mechanism and a seat plate 225 installed in accordance with embodiments of the disclosure. FIG. 2D is a cutaway side view the pylon 220 with a latch mechanism and the seat plate 225 installed in accordance with embodiments of the disclosure. While FIGS. 2C and 2D depict and describe a latch mechanism and seat plate in a pylon 220 for attachment to a streamer cable, it is appreciated that the pylon 220 may include any structural member of the streamer device configured to carry a load to facilitate attachment to the streamer cable.

The pylons 120A and 120B of FIG. 1 and/or the pylons 220A and 220B of FIG. 2 may implement the pylon 220 of FIGS. 2C and 2D. FIGS. 2C and/or 2D may include elements that have been previously described with respect to FIGS. 2A and/or 2B. Those elements have been identified in FIGS. 2C and/or 2D using the same reference numbers used in FIG. 2 and operation of the common elements is as previously described. Consequently, a detailed description of the operation of these particular elements will not be repeated in the interest of brevity.

The latch mechanisms may include a dovetail pin member 260 installed in the dovetail pin chamber 221A/B that is configured to engage a respective locking collar assembly 250. The dovetail pin 260 may be inserted through a bias spring or similar compression bias component 268 (e.g., a compression spring, Belleville spring or washer assembly, etc.). The compression bias component 268 may be installed between a stopping device or similar feature 267 (e.g., a domed bottom) of the dovetail pin 260 on a first (e.g., lower or bottom) end 266 of the bias component 268 and a seat (e.g., shoulder) of the seat plate 225 near a second (e.g., upper) end of the bias component 268. The dovetail pin 268 may include a flat top 261 with a tapered surface 262 and a flat vertical surface 264 on opposite sides forming a narrow neck 263. The upper portion 265 of the dovetail pin 268 below the neck 263 may be generally cylindrical. The middle portion of the dovetail pin 268 may also be cylindrical but with a narrower diameter than the upper portion 265 so as to accommodate the bias component 268. The bottom portion 266 may include a flat upper surface to support the bias component 268. The stopping device (or stop) 267 may be configured to slidably engage a central eccentric camming surface 269 on a transverse eccentric pin or similar rotational retention mechanism 270.

In some examples, the latch mechanism may also include an elongated, cylindrical locking rod 280 also configured to engage the respective locking collar. A spring 281 at the bottom of a vertical bore 224A/B may bias the locking rod 280 up into an engaged position. Lever arms 283 extend from opposite ends of the locking rod 280 near a midpoint. The lever arms 283 extend through substantially vertical slots 285 in each side of the pylon 220 and terminate in studs 282. In some examples, the locking rod assembly (e.g., the locking rod 280, spring 281, lever arms 283, studs 282, etc.) may only be included in one of the pylons 220A or 220B. For example, the locking rod assembly may only be included in the rear pylon 220B.

The latch mechanism may be configured to latch a locking collar 250 by first inserting the top 261 of the dovetail pin 260 through a circular entry 254 in a keyhole slot 252 of a locking collar 250. Because the narrow neck 263 of the dovetail pin 260 is slightly narrower than the width of the longitudinal slot 255, the dovetail pin 260 can slide along the slot 255 toward the end opposite the circular entry 254. As the dovetail pin 260 approaches the end of the longitudinal slot 255, the locking rod 280, via the spring 281 held in compression by the bottom surface of the locking collar 250, pops into the circular entry 254 now in alignment, thereby locking the pylon 220 to the locking collar 250. To prevent the streamer device attached to the pylon 220 from vibrating during deployment, the dovetail pin 260 may be retracted by rotating the eccentric pin 270 until the eccentric camming surface 269 is in its lower position. In this locked position, the compression bias component 268 is somewhat relaxed, but still exerts enough spring force against the seat of the seat plate 225 of the dovetail pin chamber 221 to hold the locking collar 250 to the pylon 220.

In some examples, when damaged, the seat plate 225 may be removed and replaced with a new seat plate 225. The ability to remove and replace the seat plate 225 may reduce operational costs as compared with implementations where damage to a seat requires a streamer device to be replaced. In addition, depending on a material, the seat plate 225 may also be able to withstand a higher pull force before failure than a seat built into the pylon 220.

Figure 3A:
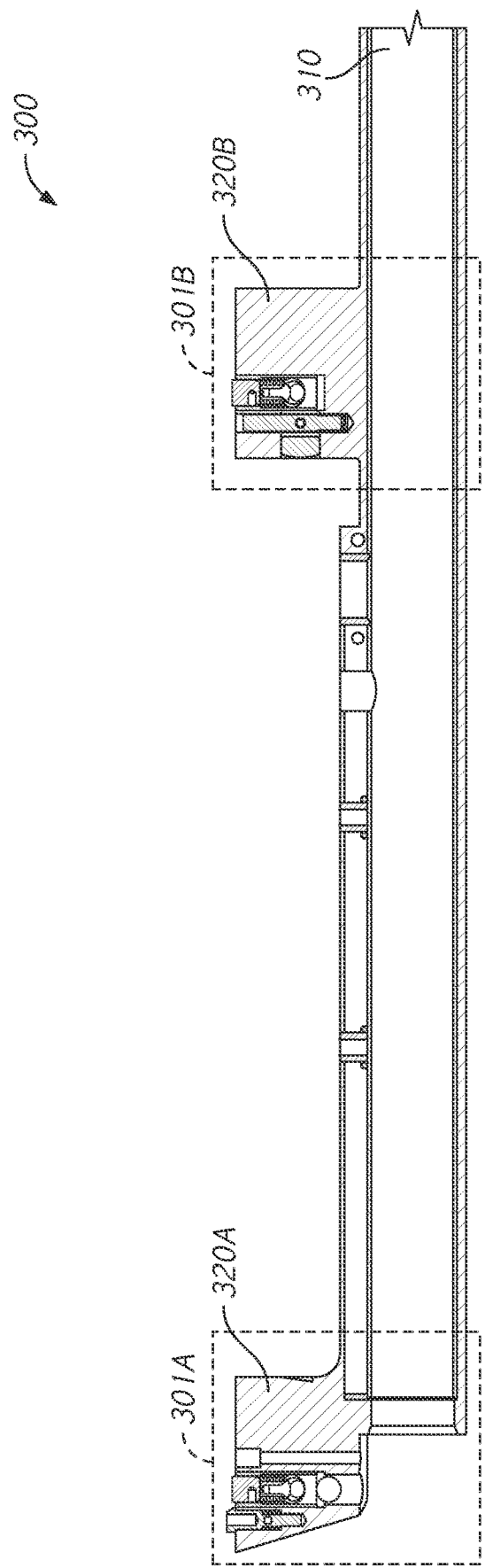
FIGS. 3A-3C depict cross-sectional views of a streamer device 310 in accordance with embodiments of the disclosure.
Figure 3B:
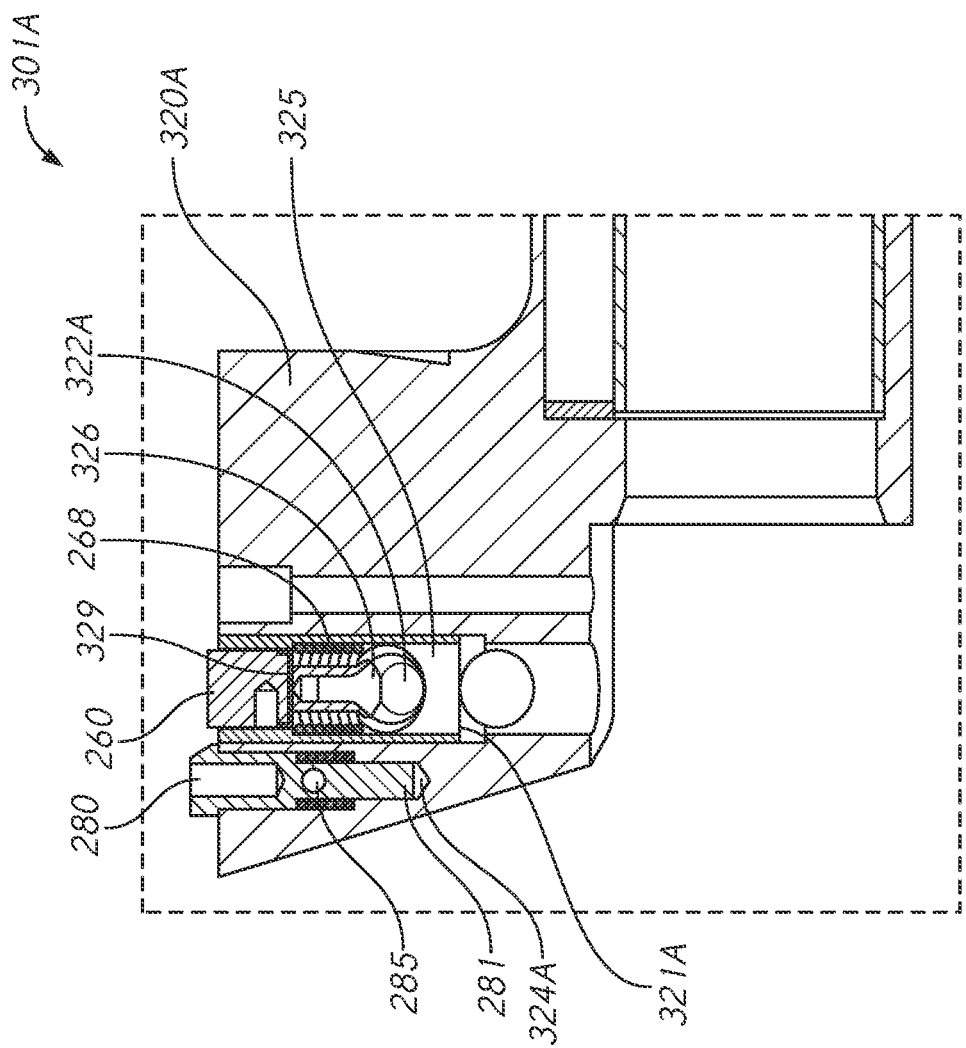
Figure 3C:
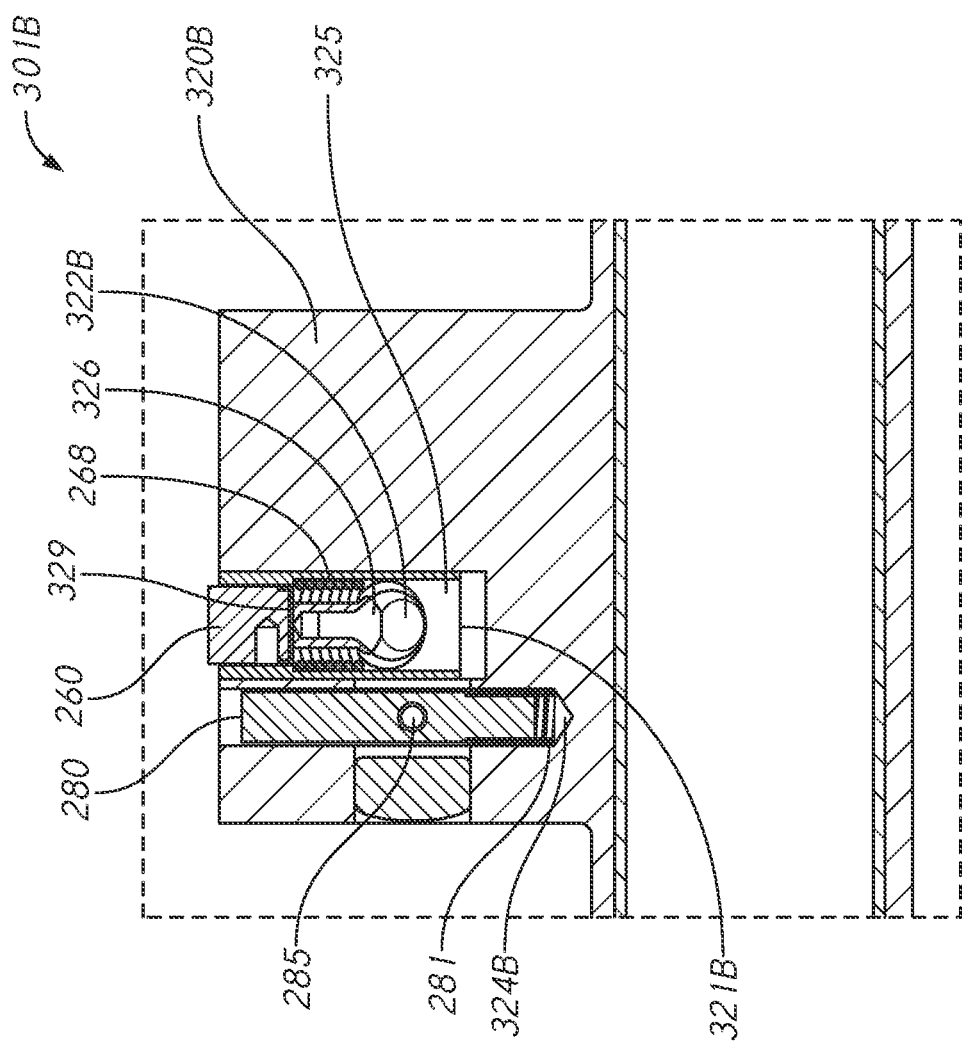
Figure 3D:
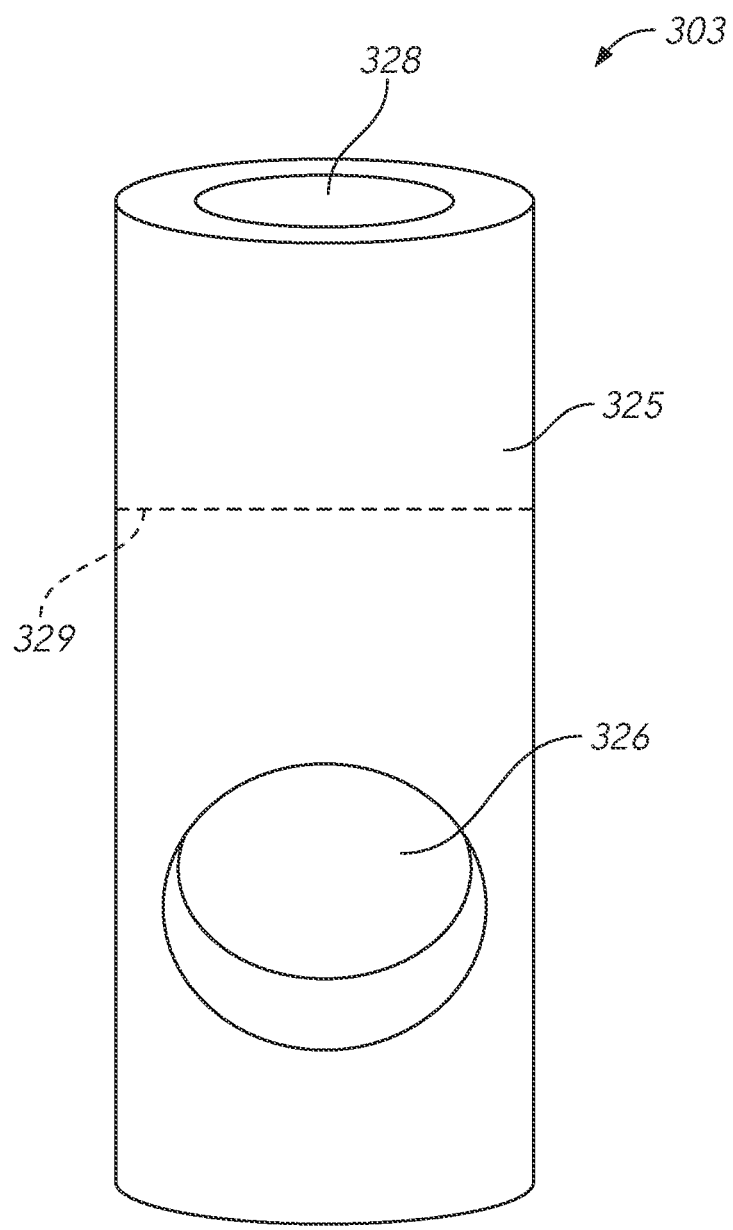
FIG. 3D depicts an isometric view of a side of a seat tube insert in accordance with embodiments of the disclosure.

FIGS. 3A-3D depict examples of a second embodiment of a streamer device implementation that includes a dovetail chamber seat tube insert (e.g., as the seat component) in accordance with embodiments of the disclosure. FIGS. 3A-3C depict cross-sectional views 300, 301A, and 301B, respectively, of a streamer device 310 in accordance with embodiments of the disclosure. FIG. 3D depicts an isometric view 303 of a side of a seat tube insert 325 in accordance with embodiments of the disclosure. While FIGS. 3A-3C depict and describe the streamer device 310 as having the pylons 320A and 320B for attachment to a streamer cable, it is appreciated that the pylons 320A and 320B may include any structural member of the streamer device 310 configured to carry a load to facilitate attachment to the streamer cable.

The streamer device 110 of FIG. 1 may implement the streamer device 310, in some examples. The streamer device 310 includes pylons 320A and 320B. For clarity, some features of the streamer device 310 are intentionally omitted from FIGS. 3A-3C. However, it is understood that the streamer device 310 may include all of the features described with reference to the streamer device 110 of FIG. 1 without departing from the scope of the disclosure. The cross-sectional view 300 is a cross-sectional view of the entire streamer device 310. The cross-sectional view 301A is a magnified cross-sectional view of the pylon 320A and the cross-sectional view 301B is a magnified cross-sectional view of the pylon 320B.

As shown, the pylon 320A includes a seat tube insert aperture or chamber 321A configured for the seat tube insert 325 and a dovetail pin member or similar retention mechanism 260 including the compression bias component 268, an aperture 322A that extends transversely through the pylon 320A and is configured to receive an eccentric pin 270, and a vertical bore 324A configured for a locking rod or similar locking mechanism 280. Similarly, the pylon 320B includes seat tube insert chamber 321B configured for the seat tube insert 325 and a dovetail pin retention mechanism including the bias component 268, an aperture 322B that extends transversely through the pylon 220A and is configured to receive an eccentric pin 270, and a vertical bore 324B configured for a locking rod mechanism. The chambers 321A and 321B may extend vertically in the respective pylon 320A and 320B, and have dimensions based on measurements of the seat tube insert 325. In some examples, the seat tube insert 325 may have a cylindrical shape.

The seat tube insert 325 may include an aperture 326 that extends through the seat tube insert 325 radially. The aperture 326 is configured to align with the respective transverse aperture 322A or 322B when installed in the respective chamber 321A or 321B. The eccentric pin (e.g., the eccentric pin 270 of FIG. 2C or 2D) inserted through the aperture 326 and the respective aperture 322A or 322B is configured to both control the latch mechanism and to retain the seat tube insert 325 in the respective chamber 321A or 321B.

While the aperture 326 is depicted as circular or oval, other shapes may be implemented without departing from the scope of the disclosure. In some examples, additional fasteners, pins, adhesive bonding, welding, or combinations thereof may be added to affix the seat tube insert 325 in the respective chamber 321A or 321B. Selection of the additional fasteners, pins, adhesive bonding, welding, or combinations thereof may be determined based on the material of the seat tube insert 325. In some examples, a shape and design of the seat tube insert 325, as well as a means for affixing the seat tube insert 325 to the respective pylon 320A and 320B, may be different for each pylon 320A and 320B, such as in circumstances where the pylons 320A and 320B have different physical shapes and sizes.

The seat tube insert 325 may include a circular bore 328 formed through the seat tube insert 325 axially from a first end to a second end. In some examples, when installed, the first end is a bottom end and the second end is a top end. The diameter of the circular bore 328 may be different at the first end of the seat tube insert 325 than at the second end of the seat tube insert 325. For example, the circular bore 328 of the seat tube insert 325 may have a first diameter extending from the first end toward the second end to a transition point or feature (e.g., seat or shoulder) 329 and a second diameter extending from the second end toward the first end to the transition point 329.

The transition 329 may form the seat or shoulder that is configured to hold an upper end of the compression bias component 268 in the pylon 320A and 320B. Thus, the first diameter may be greater than the second diameter. In some examples, the first diameter of the circular bore 328 may be based on a diameter of the bias component 268 and the second diameter may be based on the diameter of the dovetail pin 260. The seat 329 may be closer to a top of the seat tube insert 325, in some examples.

The measurements of the seat tube insert 325 may be based on a transverse thickness and vertical height of the pylon 320A and 320B, as well as the material and desired characteristics of the seat tube insert 325. The seat tube insert 325 may be constructed from at least one of aluminum, stainless steel, a thermoplastic material (e.g., a polycarbonate material such as an acetal material), thermoset, or a metal alloy (e.g., including at least one of titanium, brass, or bronze), any other material suitable for a seismic streamer application, or combinations thereof. In some examples, the material(s) may be selected based on a lack of magnetic (nonmagnetic) properties and/or reduced susceptibility (resistance) to corrosion in a saltwater environment.

In some examples, one or both of the pylons 320A or 320B may include the chamber 321A and 321B in response to damage to an original built-in seat in the pylons 320A and 320B. In some examples, one of the pylons 320A or 320B may include a built-in seat and the other may include the respective chamber 321A or 321B, such as in a situation where one built-in seat was damaged. In implementations where the chambers 321A or 321B are formed to repair a damaged built-in seat, the vertical position of the seat 329 within the seat tube insert 325 may be located in a same approximate vertical position as the original built-in seat when the seat tube insert 325 is installed in the respective chamber 321A and 321B. In other examples, the pylons 320A and 320B may be originally manufactured with the chambers 321A and 321B configured to receive the seat tube inserts 325. In either implementation, damage to a seat used to latch to a collar may be repaired by replacing the seat tube insert 325, rather than replacing the entire streamer device 310, which may reduce operational costs.

It is understood that the pylons 320A or 320B may include a latch mechanism to latch to a collar (e.g., one of the locking collar assemblies 150A or 150B of FIG. 1 or the locking collar assembly 250 of FIG. 2C). Some details of the latch mechanism have been omitted from the depictions and descriptions associated with FIGS. 3A-3D for clarity. In some examples, the latch mechanisms included in the pylons 320A or 320B may include some or all of the same or similar components as the latch mechanism described with reference to FIGS. 2C and 2D without departing from the scope of the disclosure.

Figure 4A:
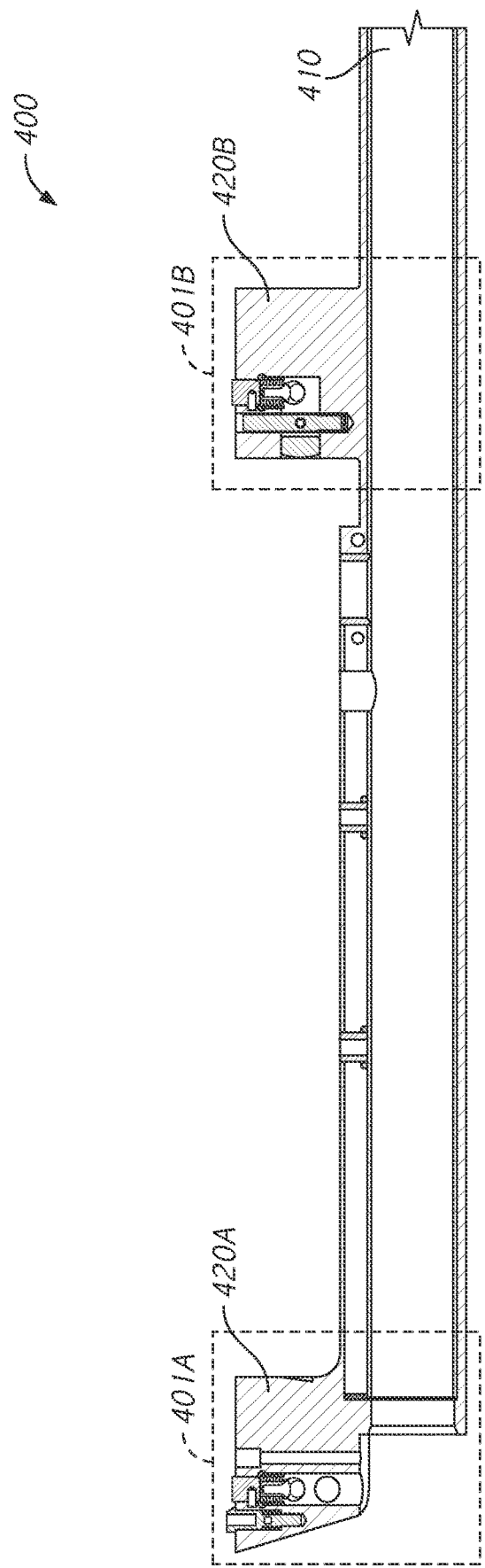
FIGS. 4A-4C depict cross-sectional views of a streamer device in accordance with embodiments of the disclosure.
Figure 4B:
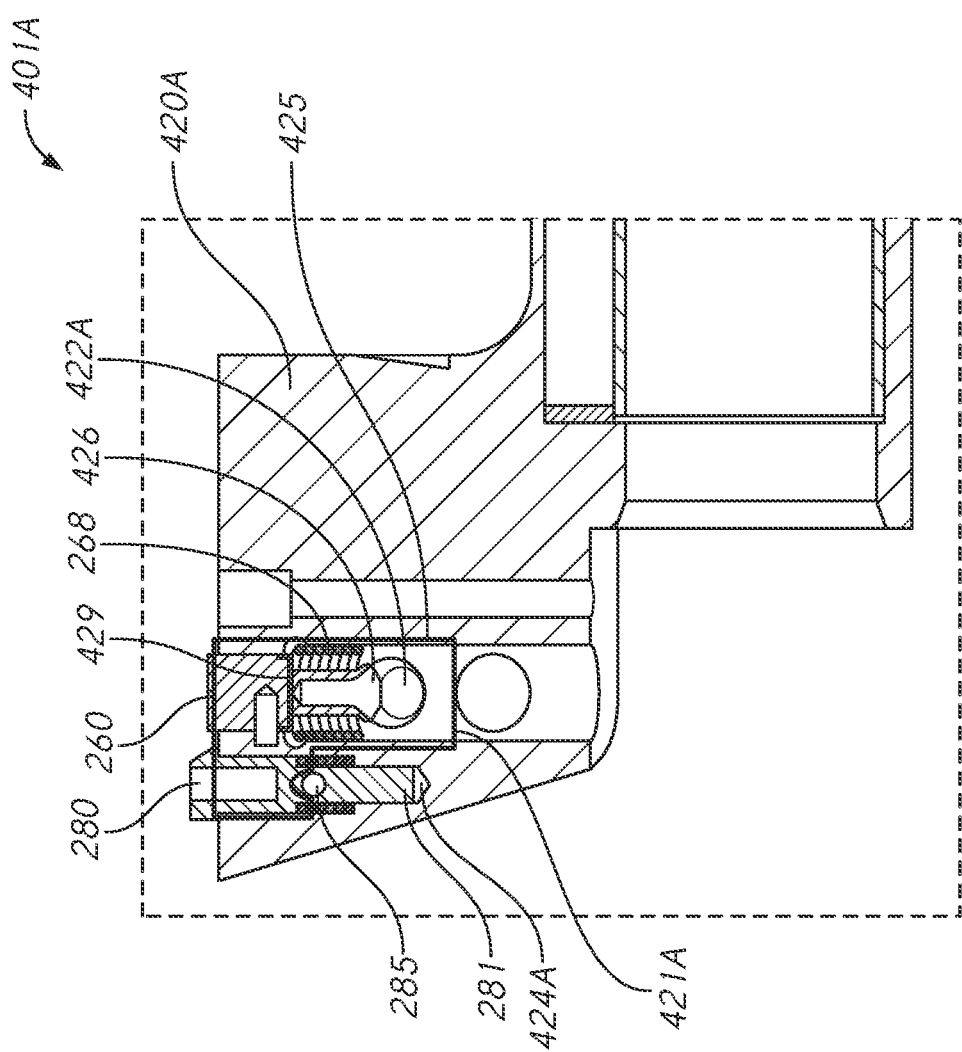
Figure 4C:
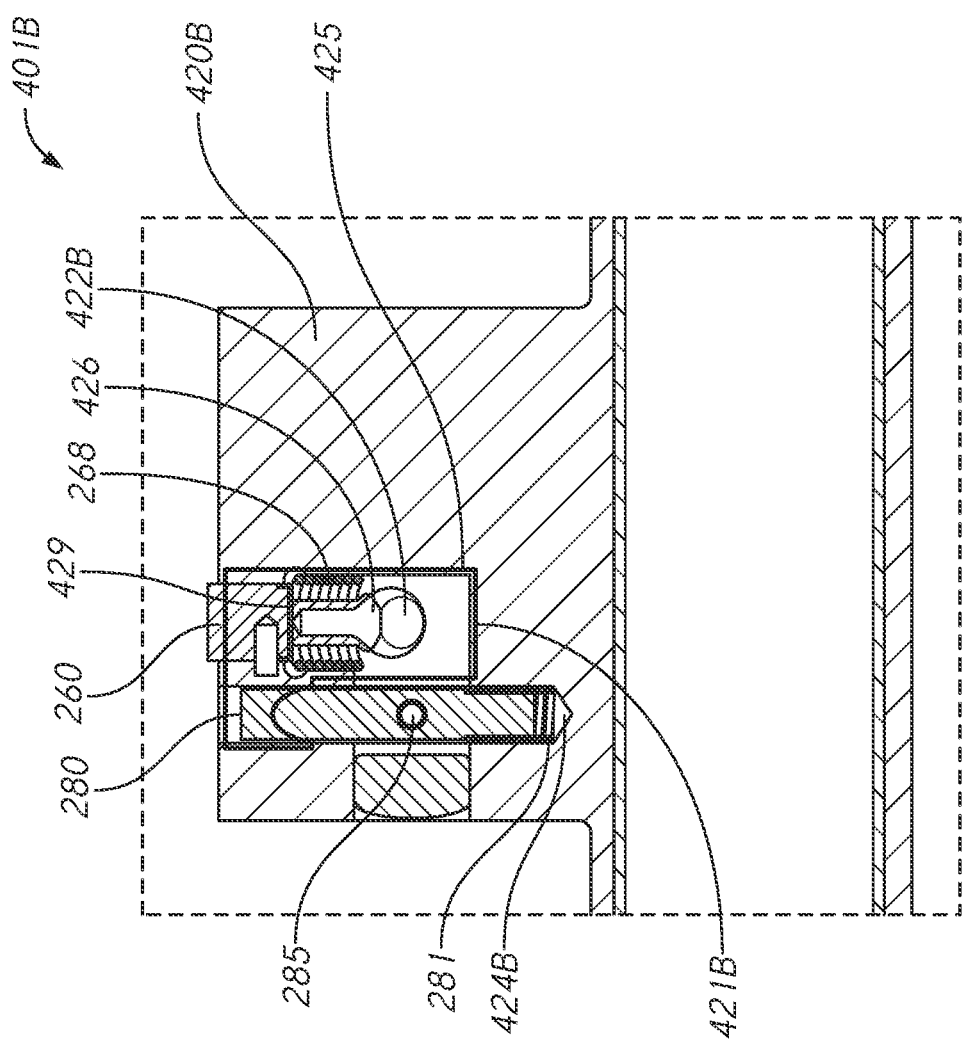
Figure 4D:
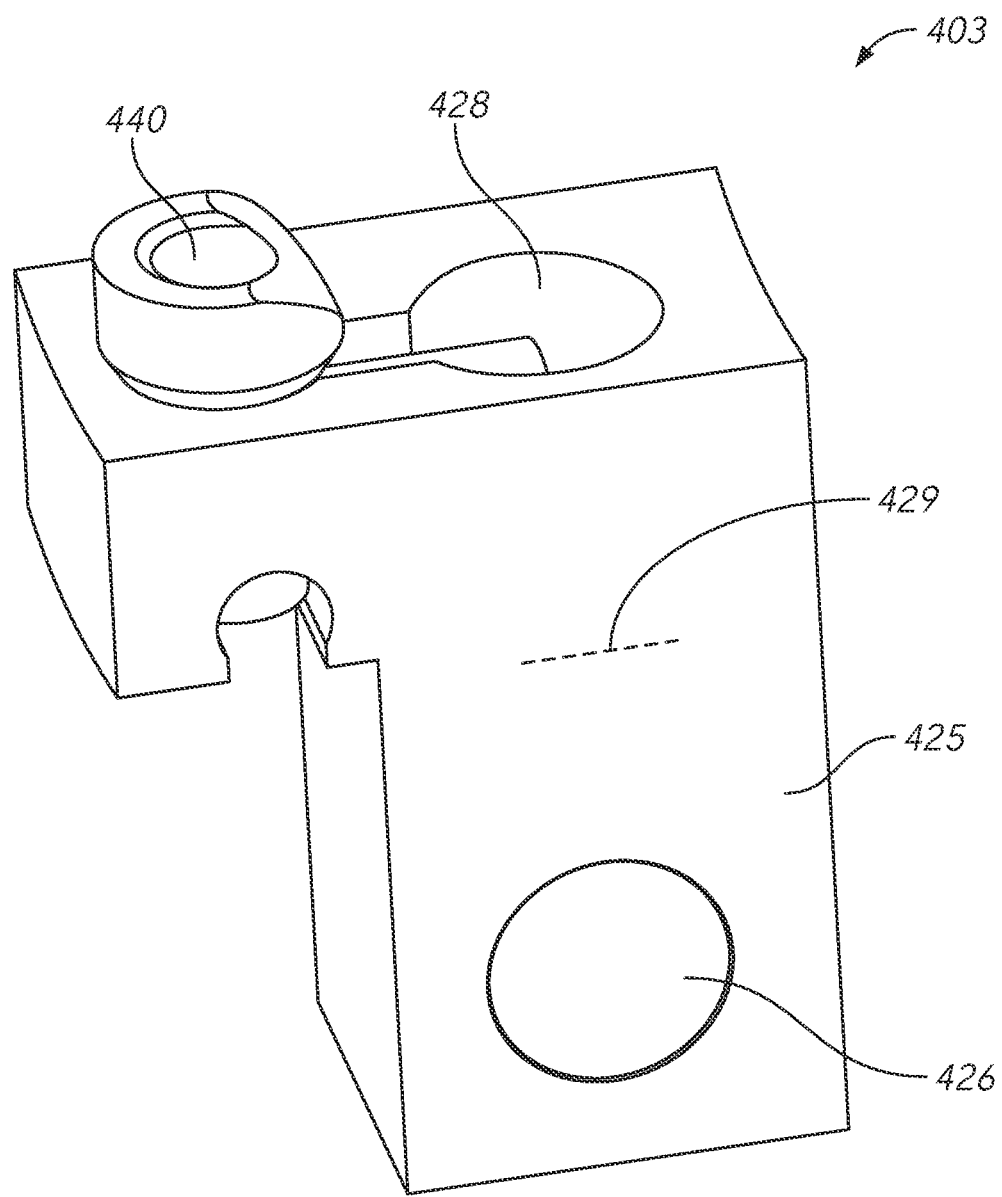
FIG. 4D depicts a perspective view of a side of a modular latch mechanism in accordance with embodiments of the disclosure.

FIGS. 4A-4D depict examples of a third embodiment of a streamer device implementation that includes a modular latch mechanism (e.g., that includes the seat component) in accordance with embodiments of the disclosure. FIGS. 4A-4C depict cross-sectional views 400, 401A, and 401B, respectively, of a streamer device 410 in accordance with embodiments of the disclosure. FIG. 4D depicts a perspective view 403 of a side of a modular latch mechanism 425 in accordance with embodiments of the disclosure. While FIGS. 4A-4C depict and describe the streamer device 410 as having the pylons 420A and 420B for attachment to a streamer cable, it is appreciated that the pylons 420A and 420B may include any structural member of the streamer device 410 configured to carry a load to facilitate attachment to the streamer cable.

The streamer device 110 of FIG. 1 may implement the streamer device 410, in some examples. The streamer device 410 includes pylons 420A and 420B. For clarity, some features of the streamer device 410 are intentionally omitted from FIGS. 4A-4C. However, it is understood that the streamer device 410 may include all of the features described with reference to the streamer device 110 of FIG. 1 without departing from the scope of the disclosure. The cross-sectional view 400 is a cross-sectional view of the entire streamer device 410. The cross-sectional view 401A is a magnified cross-sectional view of the pylon 420A and the cross-sectional view 401B is a magnified cross-sectional view of the pylon 420B.

As shown, the pylon 420A includes a modular latch chamber 421A configured for the modular latch mechanism or latch module 425, an aperture 422A that extends transversely through the pylon 420A and is configured to receive an eccentric pin 270 to hold the latch mechanism module 425 in place, and a vertical bore 424A configured for a locking rod or mechanism 280. Similarly, the pylon 420B includes modular latch chamber 421B configured for the latch module 425, an aperture 422B that extends transversely through the pylon 420A and is configured to receive an eccentric pin 270 to hold the latch module 425 in place, and a vertical bore 424B configured for a locking rod mechanism. The latch module 425 may include components of a latch mechanism, such as some or all of the same or similar components described with reference to FIGS. 2C and 2D, or combinations thereof, including a dovetail pin retention mechanism 260 including the compression bias component 268. The modular latch chambers 421A and 421B may extend vertically in the respective pylon 420A and 420B, and have dimensions based on measurements of the latch module 425.

The latch module 425 may include an aperture 426 that extends transversely through the latch module 425. The aperture 426 is configured to align with the respective transverse aperture 422A or 422B when installed in the respective modular latch chamber 421A or 421B. The eccentric pin (e.g., the eccentric pin 270 of FIG. 2C or 2D) inserted through the aperture 426 and the respective aperture 422A or 422B is configured to both control the latch mechanism retained in the latch module 425 and to retain the latch module 425 in the respective modular latch chamber 421A or 421B.

In some examples, additional fasteners, pins, adhesive bonding, welding, or combinations thereof may be added to affix the latch module 425 in the respective modular latch chamber 421A or 421B. Selection of the additional fasteners, pins, adhesive bonding, welding, or combinations thereof may be determined based on the material of the latch module 425. In some examples, a shape and design of the latch module 425, as well as a means for affixing the latch module 425 to the respective pylon 420A and 420B, may be different for each pylon 420A and 420B, such as in circumstances where the pylons 420A and 420B have different physical shapes and sizes.

While the aperture 426 is depicted as circular or oval, other shapes may be implemented without departing from the scope of the disclosure. The latch module 425 may include a circular bore 428 formed vertically from a first end to a second end. In some examples, when installed, the first end is a bottom end and the second end is a top end. The diameter of the circular bore 428 may be different at the first end than at the second end. For example, the circular bore 428 may have a first diameter extending from the first end toward the second end to a transition point or feature (e.g., seat or shoulder) 429 and a second diameter extending from the second end toward the first end to the transition 429.

The transition 429 may form the seat or shoulder that is configured to hold an upper end of the compression bias component 268 in the latch module 425. Thus, the first diameter may be greater than the second diameter. The seat 429 may be closer to a top of the latch module 425, in some examples. In some examples, the first diameter of the circular bore 428 may be based on a diameter of the bias component 268 and the second diameter may be based on the diameter of the dovetail pin 260. The latch module 425 may include a second circular bore 440 formed vertically from the second end for the locking rod 280. The diameter of the circular bore 428 may be based on a diameter of the locking rod 280, in some examples.

The measurements of the latch module 425 may be based on a transverse thickness and vertical height of the pylon 420A and 420B, as well as the material and desired characteristics of the seat 429 and the latch module 425. The latch module 425 may be constructed from at least one of aluminum, stainless steel, a thermoplastic material (e.g., a polycarbonate material such as an acetal material), thermoset, or a metal alloy (e.g., including at least one of titanium, brass, or bronze), any other material suitable for a seismic streamer application, or combinations thereof. In some examples, the material(s) may be selected based on a lack of magnetic (nonmagnetic) properties and/or reduced susceptibility (resistance) to corrosion in a saltwater environment.

In some examples, one or both of the pylons 420A or 420B may include the modular latch chamber 421A and 421B in response to damage to an original built-in seat in the pylons 420A and 420B. In some examples, one of the pylons 420A or 420B may include a built-in seat and the other may include the respective modular latch chamber 421A or 421B, such as in a situation where one built-in seat was damaged. In implementations where the modular latch chambers 421A or 421B are formed to repair a damaged built-in seat, the vertical position of the seat 429 within the latch module 425 may be located in a same approximate vertical position as the original built-in seat when the latch module 425 is installed in the respective modular latch chamber 421A and 421B. In other examples, the pylons 420A and 420B may be originally manufactured with the modular latch chambers 421A and 421B configured to receive the seat tube inserts 325. In either implementation, damage to a seat used to latch to a collar may be repaired by replacing the latch module 425, rather than replacing the entire streamer device 410, which may reduce operational costs.

It is understood that the pylons 420A or 420B and/or the latch module 425 may include a latch mechanism to latch to a collar (e.g., one of the locking collar assemblies 150A or 150B of FIG. 1 or the collar 250 of FIG. 2C). Some details of the latch mechanism have been omitted from the depictions and descriptions associated with FIGS. 4A-4D for clarity. In some examples, the latch mechanisms included in the pylons 420A or 420B and/or the latch module 425 may include some or all of the same or similar components as the latch mechanism described with reference to FIGS. 2C and 2D without departing from the scope of the disclosure.

EXAMPLES

A representative system or apparatus according to Example 1 includes a device configured to attach to a locking collar assembly that includes a pylon, and a latch mechanism and a seat component retained in the pylon. The latch mechanism can include a pin member configured to attach to the locking collar assembly and a compression bias component. The seat component can be configured to provide a seat to retain a first end of the compression bias component. The compression bias component can be configured to apply a bias force on the pin member to attach the locking collar assembly to the device. The bias force may be determined based at least in part on a position of the seat component; e.g., the bias force may be responsive to the position of the seat component.

Example 2 includes the system or apparatus of Example 1, where the seat component is selectively removable from the pylon.

Example 3 includes a system or apparatus according to Example 1 or 2; e.g., where the seat component includes a seat plate configured to be inserted into a slot formed in the pylon.

In Example 4, the seat plate includes an aperture that extends through the seat plate from a first surface to a second surface.

In Example 5, the aperture of the seat plate has a first diameter extending from the first surface toward the second surface to a transition feature between the first end and the second end, and a second diameter extending from the second surface toward the first surface to the transition feature, wherein the seat is formed at the transition feature.

In Example 6, when the seat plate is installed into the slot in the pylon, the first surface defines a bottom surface and the second surface defines a top surface, in a working orientation of the device.

In Example 7, the first diameter is greater than the second diameter.

Example 8 includes a system or apparatus according to one or more of Examples 4-7; e.g., where the seat plate includes a notch configured to mate with a protrusion in the slot of the pylon to retain the seat plate in the slot.

In Example 9, the slot is formed transversely through the pylon, substantially perpendicular to a longitudinal axis of the pylon.

Example 10 includes a system or apparatus according to one or more of Example 5-9; e.g., where the first diameter of the aperture is adapted for a diameter of the compression bias component and the second diameter is adapted for a diameter of a dovetail on the pin member.

In Example 11, the seat component includes a seat tube insert configured to be inserted into chamber formed in the pylon, wherein the seat tube insert has a cylindrical shape.

In Example 12, the seat tube insert has a circular bore formed through the seat tube insert axially from a first end to a second end.

In Example 13, the circular bore of the seat tube insert has a first diameter extending from the first end toward the second end to a transition defined between the first end and the second end, and a second diameter extending from the second end toward the first end to the transition, wherein the seat is defined at the transition.

In Example 14, when installed in the chamber, the first end of the seat tube insert is a bottom end and the second end is a top end, in a working orientation of the device.

In Example 15, the first diameter is greater than the second diameter.

Example 16 includes a system or apparatus according to one or more of Examples 13-15; e.g., where the first diameter of the aperture is adapted for receiving the compression bias component and the second diameter is adapted for receiving a dovetail on the pin member.

Example 17 includes a system or apparatus according one or more of Examples 11-16, where the seat tube insert has an aperture that extends through the seat tube insert radially; e.g., where when the seat tube insert is installed in the chamber, the aperture aligns with a transverse aperture formed in the pylon.

Example 18 includes a transverse eccentric pin extending through the aperture of the seat tube insert and the aperture of the pylon, wherein the eccentric pin is configured to control a position of the pin member to selectively retain the seat tube insert in the chamber.

In Example 19, the seat tube insert is further retained in the chamber via at least one of an additional fastener or pin, adhesive bonding, or welding.

In Example 20, a system or apparatus according to any one or more of Examples 1-19 includes a latch module configured to be inserted into a latch chamber formed in the pylon; e.g., where the latch module is selectively removable from the latch chamber and configured to contain the latch mechanism and the seat component.

In Example 21, the latch module includes a circular bore formed vertically from a first end to a second end.

In Example 22, the circular bore of the latch module has a first diameter extending from the first end toward the second end to a transition defined between the first end and the second end, and a second diameter extending from the second end toward the first end to the transition, wherein the seat is formed at the transition.

In Example 23, when the latch module is installed in the latch chamber, the first end is a bottom end and the second end is a top end, in a working orientation of the device.

In Example 24, the first diameter is greater than the second diameter.

In Example 25, the first diameter of the aperture is adapted for a diameter of the compression bias component and the second diameter is adapted for a diameter of a dovetail on the pin member.

In Example 26, the latch module includes an aperture that extends through the latch module transversely; e.g., where when the latch module is installed in the latch chamber, the aperture aligns with a transverse aperture formed in the pylon.

Example 27 includes a transverse eccentric pin extending through the aperture of the latch module and the aperture of the pylon; e.g., where the eccentric pin is configured to control a position of the pin member to retain the latch module in the latch chamber.

In Example 28, the latch module is further retained in the latch chamber via at least one of an additional fastener or pin, adhesive bonding, or welding.

In Example 29, the seat component is unthreaded.

Example 30 includes a system or apparatus according to one or more of Examples 1-29; e.g., where the seat component includes a seat material that forms the seat and is different from a structural material of the pylon.

In Example 31, the seat material is different from a structural material of the pylon.

Example 32 includes a system or apparatus according to one or more of Examples 1-31; e.g., where the pylon is formed from a polyurethane material defining the structural material of the pylon.

Example 33 includes a system or apparatus according to one or more of Examples 30-32; e.g., where the seat material includes at least one of a thermoplastic material, a thermoset material, or a metal alloy including at least one of titanium, brass, or bronze.

Example 34 includes a system or apparatus according to one or more of Examples 30-33; e.g., where the seat material is nonmagnetic and resistant to corrosion in a saltwater environment.

Example 35 includes a system or apparatus according to one or more of Examples 1-34; e.g., where the locking collar assembly is configured to attach the device to a streamer cable.

Example 36 includes a streamer cable and a plurality of devices attached to the streamer cable via respective locking collar assemblies according to Example 35.

Example 37 includes a system or apparatus according to one or more of Examples 1-36; e.g., where the device comprises a streamer device including at least one of a positional control device, a velocimeter, a speedlog device, or an acoustic ranging device.

Example 38 includes a system or apparatus according to one or more of Examples 1-37; e.g., where the device includes stabilization or steering foils configured to stabilize or control a position of the device in a water column.

In Example 39, a system or apparatus according to any one or more of Examples 1-37 includes a second pylon defined on the device and configured to retain a second latch mechanism and a second seat component. The second latch mechanism can include a second pin member configured to attach to a second locking collar assembly and a second compression bias component. The second seat component can be configured to provide a second seat to retain a first end of the second compression bias component. The second compression bias component can be configured to apply a second bias force on the second pin member to attach the second locking collar assembly to the device. The second bias force may be responsive to or based at least in part on a position of the second seat component.

In Example 40, the second seat component includes one of a seat plate, a seat tube insert, or a latch module.

Example 41 includes a system or apparatus according to one or more of Examples 39-40; e.g., where the second seat component is unthreaded and selectively removable from the second pylon.

Example 42 includes a system or apparatus according to one or more of Examples 39-41; e.g., where the second seat component has a different configuration from the seat component of the first pylon, or is formed of a different material.

Example 43, includes a system or apparatus according to one or more of Examples 39-42; e.g., where the second seat component is formed from at least one of a thermoplastic material, a thermoset material, or a metal alloy including at least one of titanium, brass, or bronze.

In Example 44, a streamer device includes a pylon configured to attach to a locking collar, and a latch mechanism with a seat component. The latch mechanism can include a pin member configured to attach to the locking collar and a bias component. The seat component can be configured to retain the bias component when the pylon is attached to the locking collar. The bias component can be configured to bias the pin member to hold the locking collar to the pylon. The bias may be controlled based on a position of the seat component.

In Example 45, the seat component is selectively removable from the pylon.

Example 46 includes a system or apparatus according to Example 44 or Example 45; e.g., where the seat component includes a seat plate configured to be inserted into a slot formed in the pylon.

In Example 47, the seat plate includes an aperture that extends through the seat plate from a first surface to a second surface.

In Example 48, the aperture of the seat plate has a first diameter extending from the first surface toward the second surface to a transition feature between the first end and the second end, and a second diameter extending from the second surface toward the first surface to the transition feature; e.g., where the seat component is formed to seat a first end of the bias component at the transition feature.

In Example 49, the seat plate is installed into the slot in the pylon, the first surface is a bottom surface and the second surface is a top surface, in a working configuration of the streamer device.

Example 50 includes a system or apparatus according to Example 48 or 49; e.g., where the first diameter is greater than the second diameter.

Example 51 includes a system or apparatus according to one or more of Examples 47-51; e.g., where the seat plate includes a notch configured to mate with a protrusion in the slot of the pylon to retain the seat plate in the slot.

In Example 52, the slot is formed transversely through the pylon, substantially perpendicular to a longitudinal axis of the pylon.

Example 53 includes a system or apparatus according to one or more of Examples 48-52; e.g., where the first diameter of the aperture is adapted for a diameter of the bias component and the second diameter is adapted for a diameter of a dovetail on the pin member.

In Example 54, the seat component includes a seat tube insert configured to be inserted into a chamber formed in the pylon, wherein the seat tube insert has a cylindrical shape.

In Example 55, the seat tube insert has a circular bore formed through the seat tube insert axially from a first end to a second end.

In Example 56, the circular bore of the seat tube insert has a first diameter extending from the first end toward the second end to a transition defined between the first end and the second end, and a second diameter extending from the second end toward the first end to the transition, wherein the seat component is formed to seat the bias component at the transition.

In Example 57, when installed in the chamber, the first end of the seat tube insert is a bottom end and the second end is a top end, in a working configuration of the device.

In Example 58, the first diameter is greater than the second diameter.

Example 59 includes a system or apparatus according to Example 57 or 58; e.g., where the first diameter of the aperture is adapted for a diameter of the bias component and the second diameter is adapted for a diameter of a dovetail on the pin member.

Example 60 includes a system or apparatus according to one or more of Examples 54-59, where the seat tube insert has an aperture that extends through the seat tube insert radially; e.g., where when the seat tube insert is installed in the chamber, the aperture aligns with a transverse aperture formed in the pylon.

In Example 61, the seat tube insert is retained in the chamber via transverse insertion of an eccentric pin of the latch mechanism through the aperture of the seat tube insert and the aperture of the pylon; e.g., where the eccentric pin is configured to control a position of the pin member.

In Example 62, a system or apparatus according to any one or more of Examples 43-61 includes a latch module configured to be inserted into a latch chamber formed in the pylon; e.g., where the latch module is selectively removable from the latch chamber and configured to contain the latch mechanism and the seat component.

In Example 63, the latch module includes a circular bore formed vertically from a first end to a second end.

In Example 64, the circular bore of the latch module has a first diameter extending from the first end toward the second end to a transition defined between the first end and the second end, and a second diameter extending from the second end toward the first end to the transition; e.g., where the seat component is formed to seat the bias component at the transition.

In Example 65, the latch module is installed in the latch chamber, the first end is a bottom end and the second end is a top end, in a working configuration of the streamer device.

In Example 66, the first diameter is greater than the second diameter.

In Example 67, the first diameter of the aperture is adapted for receiving a diameter of the bias component and the second diameter is adapted for receiving a diameter of a dovetail on the pin member.

Example 68 includes a system or apparatus according to one or more of Examples 62-67, where the latch module includes an aperture that extends through the latch module transversely; e.g., where when the latch member is installed in the latch chamber, the aperture aligns with a transverse aperture formed in the pylon.

In Example 69, the latch module is retained in the latch chamber via transverse insertion of an eccentric pin through the aperture of the latch module and the aperture of the pylon; e.g., where the eccentric pin is configured to control a position of the pin member.

Example 70 includes a system or apparatus according to one or more of Examples 44-69; e.g., where the seat component is unthreaded.

Example 71 includes a system or apparatus according to one or more of Examples 44-70; e.g., where the seat component includes a seat material that forms the seat.

In Example 72, the seat material is different from a structural material of the pylon, or any combination thereof.

Example 73 includes a system or apparatus according to one or more of Examples 44-72; e.g., where the seat material includes at least one of a thermoplastic material, a thermoset material, or a metal alloy including titanium, brass, or bronze.

Example 74 includes a system or apparatus according to one or more of Examples 44-73; e.g., where the seat material that forms the seat, wherein the seat material is nonmagnetic and resistant to corrosion in a saltwater environment.

In Example 75, a system or apparatus according to any one or more of Examples 44-74 includes stabilization or steering foils configured to stabilize or control a position of the streamer device as it moves through a water column.

In Example 76, a system or apparatus according to any one or more of Examples 44-75 includes a second pylon configured to retain a second latch mechanism and a second seat component; e.g., where the second latch mechanism includes a second pin member configured to attach to a second locking collar and a second bias component. The second seat component can be configured retain the second bias component, and the second bias component can be configured to bias the second pin member to hold the second locking collar to the second pylon. The bias may be controlled based on a position of the second seat component.

In Example 77, the second seat component includes one of a seat plate, a seat tube insert, or a latch module.

Example 78 includes a system or apparatus according to Example 76 or 77; e.g., where the second seat component is unthreaded and selectively removable from the second pylon.

Example 79 includes a system or apparatus according to one or more of Examples 76-78; e.g., where the second seat component has a different configuration from the seat component of the first pylon, or is formed of a different material.

Example 80 includes a system or apparatus according to one or more of Examples 76-79; e.g., where the second seat component is formed from at least one of a thermoplastic material, a thermoset material, or a metal alloy including titanium, brass, or bronze.

Example 81 comprise a method for operating a system or apparatus according to any one or more of the above Examples 1-80.

Example 82 comprises a non-transitory machine-readable data storage medium including instructions that, when executed by computer processing circuitry, cause the circuitry to perform a method or process for operating a system or apparatus according to any one or more of the above Examples 1-80.

The disclosure will be illustrated and described in detail with the aid of the preferred exemplary embodiments. Nevertheless, the disclosure is not restricted to the examples disclosed. Rather, other variants may be derived therefrom by a person skilled in the art without departing from the protective scope of the disclosure.

The invention claimed is:

1. A system comprising:
   a device configured to attach to a locking collar assembly, the device comprising a pylon;
   a latch mechanism and a seat component disposed in or coupled to the pylon, the latch mechanism comprising a pin member configured to attach to the locking collar assembly and a compression bias component, and the seat component configured to provide a seat to retain a first end of the compression bias component; and
   a latch module configured for selective insertion into and removal from a latch chamber formed in the pylon, the latch module comprising or containing the latch mechanism and the seat component,
   wherein the compression bias component is configured to apply a bias force on the pin member to attach the locking collar assembly to the device, and
   wherein the bias force is responsive to a position of the seat component.

2. The system of claim 1, wherein the seat component includes a seat plate inserted into a slot formed in the pylon.

3. The system of claim 2, further comprising an aperture extending through the seat plate from a first surface to a second surface.

4. The system of claim 3, wherein the aperture has a first diameter extending from the first surface toward the second surface to a transition feature between the first surface and the second surface, and a second diameter extending from the second surface toward the first surface to the transition feature, wherein the seat is formed at the transition feature.

5. The system of claim 4, wherein the first surface defines a bottom surface and the second surface when the seat plate is installed into the slot in the pylon in a working orientation of the device.

6. The system of claim 4 wherein the first diameter is greater than the second diameter, or wherein the first diameter of the aperture is adapted to accommodate a diameter of the compression bias component and the second diameter is adapted to accommodate a diameter of a dovetail on the pin member.

7. The system of claim 1, wherein a bore extends from a first end of the latch module to a second end of the latch module.

8. The system of claim 7, wherein the bore has a first diameter extending from the first end toward the second end to a transition defined between the first end and the second end, and a second diameter extending from the second end toward the first end to the transition.

9. The system of claim 8, wherein the seat is formed at the transition between the first and second ends of the latch module, and wherein the first end is a bottom end of the latch module and the second end is a top end of the latch module, when the latch module is installed in the latch chamber in a working orientation of the device.

10. The system of claim 1, further comprising an aperture extending transversely through the latch module, wherein the aperture aligns with a transverse aperture formed in the pylon when the latch module is installed in the latch chamber.

11. The system of claim 10, further comprising an eccentric pin extending through the aperture of the latch module and the aperture of the pylon, the eccentric pin being configured to control a position of the pin member to retain the latch module in the latch chamber.

12. A system comprising:
a device configured to attach to a locking collar assembly, the device comprising a pylon; and
a latch mechanism and a seat component disposed in or coupled to the pylon, the latch mechanism comprising a pin member configured to attach to the locking collar assembly and a compression bias component, and the seat component configured to provide a seat to retain a first end of the compression bias component;
wherein the compression bias component is configured to apply a bias force on the pin member to attach the locking collar assembly to the device, and
wherein the bias force is responsive to a position of the seat component,
wherein the seat component is unthreaded.

13. The system of claim 1, wherein the seat component includes a seat material that forms the seat, wherein the seat material is different from a structural material of the pylon, or wherein the seat material is nonmagnetic and resistant to corrosion in a saltwater environment.

14. A system comprising:
a device configured to attach to a locking collar assembly, the device comprising a pylon; and
a latch mechanism and a seat component disposed in or coupled to the pylon, the latch mechanism comprising a pin member configured to attach to the locking collar assembly and a compression bias component, and the seat component configured to provide a seat to retain a first end of the compression bias component, wherein the seat component is disposed in a slot formed in the pylon that extends in a direction perpendicular to an aperture in the pylon in which the pin member is disposed;
wherein the compression bias component is configured to apply a bias force on the pin member to attach the locking collar assembly to the device; and
wherein the bias force is responsive to a position of the seat component.

15. The system of claim 14, further comprising an aperture extending through a seat plate from a first surface to a second surface.

16. The system of claim 15, wherein the aperture extending through the seat plate has a first diameter extending from the first surface toward the second surface to a transition feature between the first surface and the second surface, and a second diameter extending from the second surface toward the first surface to the transition feature, wherein the seat is formed at the transition feature.

17. The system of claim 16, wherein the first surface defines a bottom surface and the second surface when the seat plate is installed into the slot in the pylon in a working orientation of the device.

18. The system of claim 16 wherein the first diameter is greater than the second diameter, or wherein the first diameter of the aperture is adapted to accommodate a diameter of the compression bias component and the second diameter is adapted to accommodate a diameter of a dovetail on the pin member.

19. The system of claim 14, further comprising:
a latch module configured for selective insertion into removal from a latch chamber formed in the pylon, the latch module comprising or containing the latch mechanism and the seat component.

20. The system of claim 19, wherein a bore extends from a first end of the latch module to a second end of the latch module.

21. The system of claim 20, wherein the bore has a first diameter extending from the first end toward the second end to a transition defined between the first end and the second end, and a second diameter extending from the second end toward the first end to the transition.

22. The system of claim 21, wherein the seat is formed at the transition between the first and second ends of the latch module, and wherein the first end is a bottom end of the latch module and the second end is a top end of the latch module, when the latch module is installed in the latch chamber in a working orientation of the device.

23. The system of claim 19, further comprising an aperture extending transversely through the latch module, wherein the aperture aligns with a transverse aperture formed in the pylon when the latch module is installed in the latch chamber.

24. The system of claim 14, wherein the seat component is unthreaded.

* * * * *